(12) United States Patent
Kita et al.

(10) Patent No.: US 7,775,581 B2
(45) Date of Patent: Aug. 17, 2010

(54) SEALING MEMBER AND METHOD OF INSTALLING THE SAME

(75) Inventors: Yuji Kita, Hiratsuka (JP); Takeya Shimomura, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 623 days.

(21) Appl. No.: 11/729,347

(22) Filed: Mar. 28, 2007

(65) Prior Publication Data

US 2007/0228770 A1    Oct. 4, 2007

(30) Foreign Application Priority Data

Mar. 31, 2006  (JP)  .............................. 2006-097713
Dec. 27, 2006  (JP)  .............................. 2006-352569

(51) Int. Cl.
*B60J 5/04* (2006.01)
*B60J 10/08* (2006.01)

(52) U.S. Cl. .................... 296/146.7; 296/154; 296/39.1

(58) Field of Classification Search .............. 296/146.1, 296/146.5–146.7, 154, 39.1
See application file for complete search history.

(56) References Cited

U.S. PATENT DOCUMENTS

| | | | | |
|---|---|---|---|---|
| 4,957,803 A | * | 9/1990 | Foley | 428/182 |
| 5,048,234 A | * | 9/1991 | Lau et al. | 49/502 |
| 5,090,762 A | * | 2/1992 | Krieger | 296/39.1 |
| 5,345,720 A | * | 9/1994 | Illbruck et al. | 49/502 |
| 5,482,343 A | * | 1/1996 | Bradac | 296/39.1 |
| 5,609,941 A | * | 3/1997 | Cawthon | 428/172 |
| 6,197,403 B1 | * | 3/2001 | Brown et al. | 428/137 |
| 6,302,472 B1 | * | 10/2001 | Rahmstorf et al. | 296/146.5 |
| 6,412,852 B1 | * | 7/2002 | Koa et al. | 296/146.7 |
| 6,428,083 B2 | * | 8/2002 | Dettoni et al. | 296/146.7 |
| 6,474,721 B2 | * | 11/2002 | Nishikawa et al. | 296/146.6 |
| 6,615,546 B2 | * | 9/2003 | Furuyama et al. | 49/502 |
| 6,862,846 B1 | * | 3/2005 | Kirejczyk | 49/502 |
| 6,979,047 B2 | * | 12/2005 | Lin et al. | 296/146.7 |
| 7,036,868 B2 | * | 5/2006 | Kohara et al. | 296/146.7 |
| 2006/0261633 A1 | * | 11/2006 | Winborn | 296/146.7 |
| 2007/0029836 A1 | * | 2/2007 | DeWolfe et al. | 296/146.7 |
| 2007/0046064 A1 | * | 3/2007 | Winborn | 296/146.7 |

FOREIGN PATENT DOCUMENTS

JP    HEI. 7-8102    2/1995

* cited by examiner

*Primary Examiner*—Glenn Dayoan
*Assistant Examiner*—Gregory Blankenship
(74) *Attorney, Agent, or Firm*—Young Basile

(57) ABSTRACT

A sealing member that mitigates oscillating noises and its installation method is provided. In the sealing member for covering an opening formed at a door inner panel, at least one bead is installed at a covering portion facing the opening. Thus, the stiffness of the covering portion of the sealing member is increased. It is therefore possible to prevent the covering portion from oscillating, thereby inhibiting the sealing member from generating the oscillating noises.

19 Claims, 13 Drawing Sheets

US 7,775,581 B2

SEALING MEMBER AND METHOD OF INSTALLING THE SAME

CROSS-REFERENCE TO RELATED APPLICATIONS

This application claims priority of Japanese Patent Application No. 2006-097713, filed on Mar. 31, 2006, and No. 2006-352569, filed on Dec. 27, 2006, each of which is incorporated herein in its entirety by reference.

TECHNICAL FIELD

The present invention relates to a sealing member installed at a door panel of a vehicle and a method of installing the sealing member.

BACKGROUND

An opening such as a hole for installation is generally formed at a conventional inner panel of a vehicular door. Japanese Laid-Open Utility Model Publication No. (Hei.) 7-8102 discloses an example of such a door inner panel wherein a sealing screen for covering the opening is installed. The sealing screen prevents water or dust from entering into a vehicle compartment through the opening.

BRIEF SUMMARY

Embodiments of a sealing member are taught herein. A sealing member for covering an opening in a door inner panel of a vehicle includes, for example, a covering portion configured and arranged to cover the opening of the door inner panel and at least one bead formed in the covering portion.

Another embodiment of a sealing member for a door having an opening formed on an inner panel includes a covering portion configured and arranged to cover the opening of the inner panel and at least one reinforcement formed on the covering portion.

As another example, a sealing member for a door inner panel having an opening formed therein includes means for covering the opening at the door inner panel and means for reinforcing at least a portion of the covering means facing the opening.

Embodiments of a door for a vehicle are also taught herein. One such door comprises a door inner panel having an opening formed thereon and a sealing member having at least one bead. The sealing member is coupled to the door inner panel such that the at least one bead is located on a side of the sealing member arranged toward a passenger compartment of the vehicle.

Methods for installing the sealing member are also taught herein. According to one example of a method of installing a sealing member at a door inner panel having an opening, the method comprises installing a sealing member at the door inner panel and covering the opening, wherein the sealing member includes at least one bead on a surface facing the opening, and affixing the sealing member to the door inner panel.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In known inner panels of a vehicle door, a sealing screen covers an opening to prevent water or dust from entering into the vehicle compartment through the opening. However, the covering portion of the sealing screen that faces the opening of the door inner panel cannot be properly connected to the door inner panel. As a result, when the opening is quite large, a problem may occur in that the covering portion of the sealing screen can oscillate due to the vibrations of the vehicle, thereby generating oscillating noises.

In contrast, embodiments of the sealing member and method for installing the sealing member disclosed herein prevent the sealing member from generating or oscillating noise.

Figure 1:
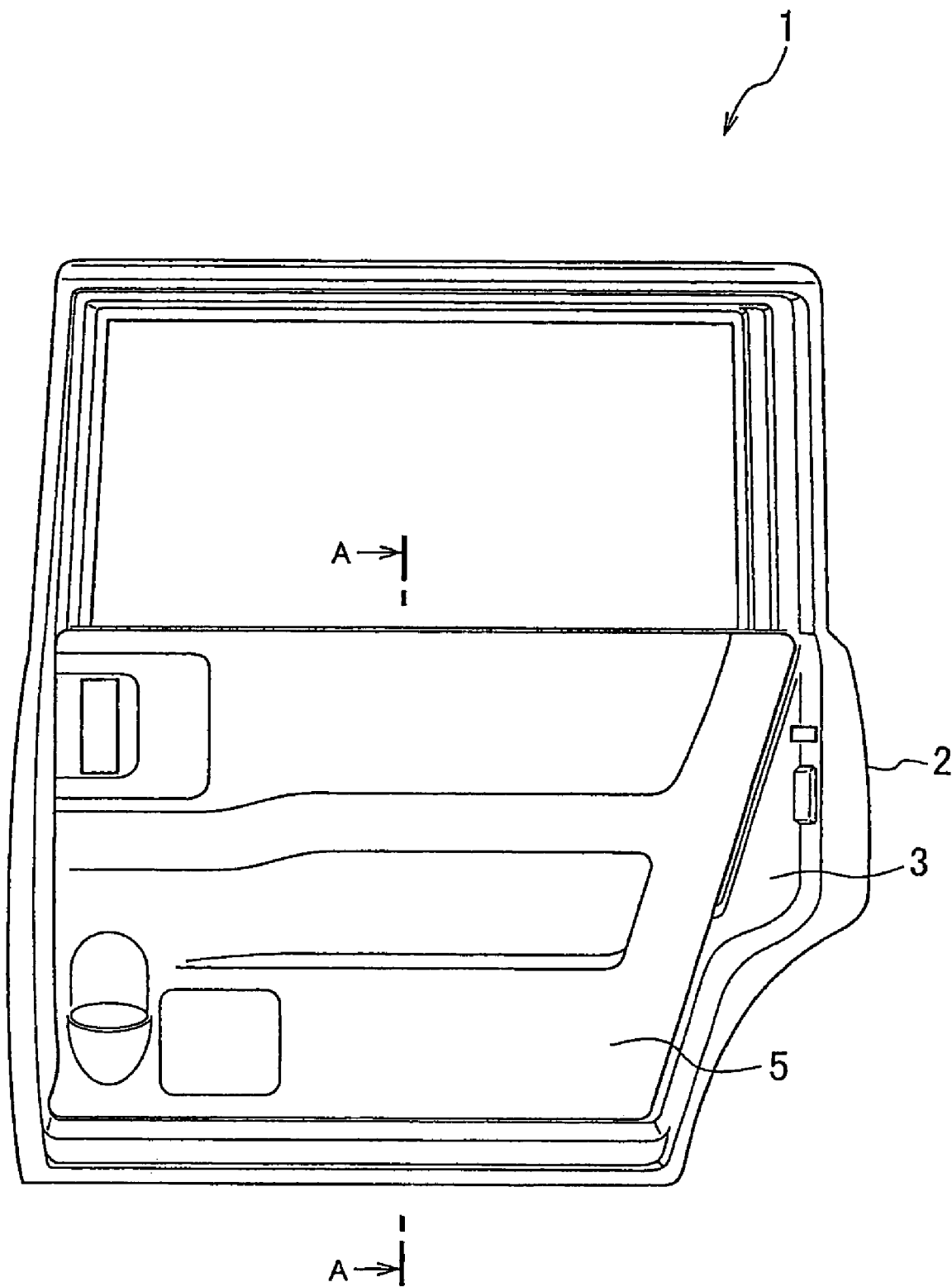
FIG. 1 is an elevational view of a side door of a vehicle constructed in accordance with a first embodiment when viewed from inside of a vehicle compartment.
Figure 2:
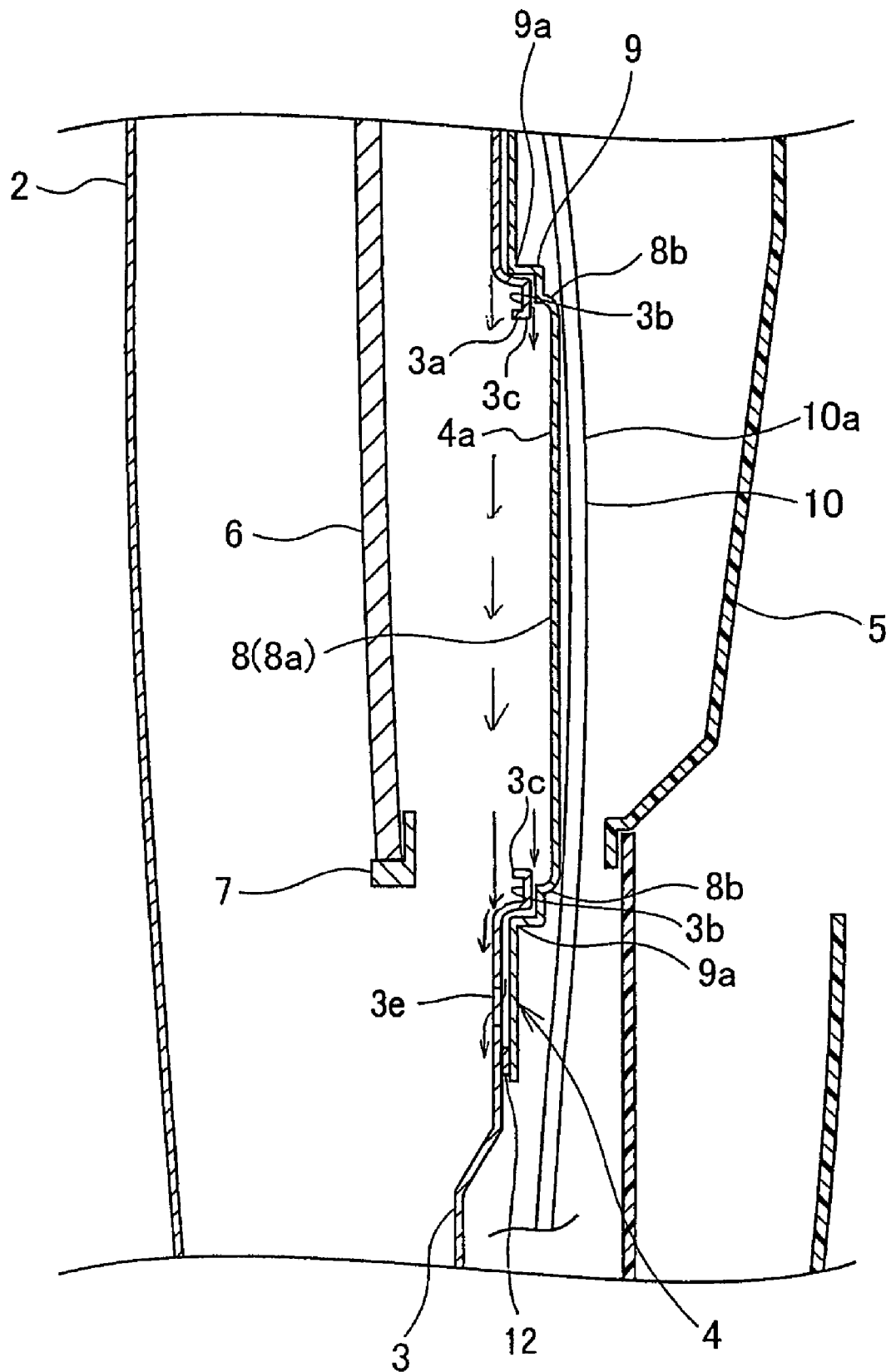
FIG. 2 is a cross-sectional view taken along the line A-A shown in FIG. 1.
Figure 3:
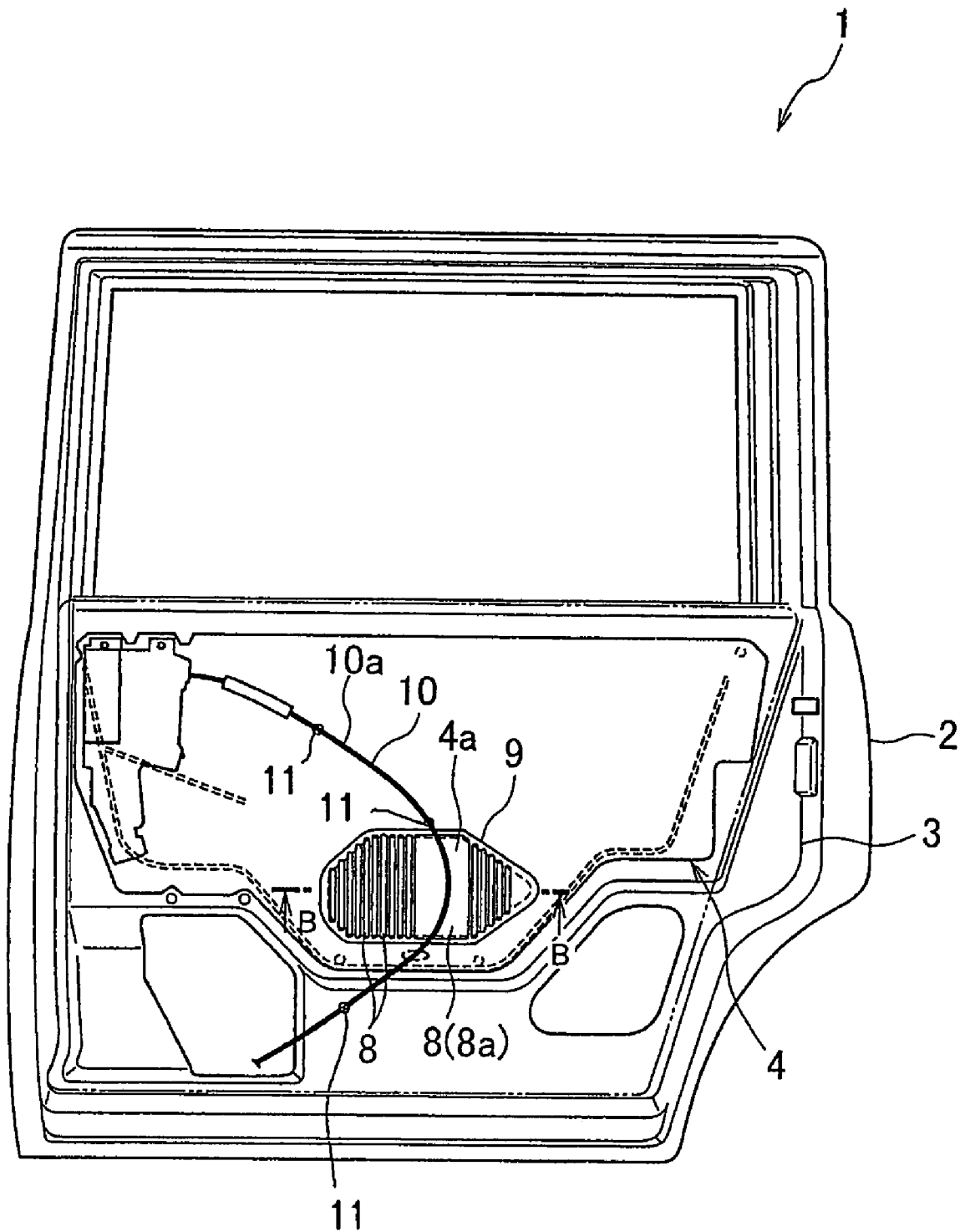
FIG. 3 is an elevational view of the inside structure of the side door of a vehicle constructed in accordance with the first embodiment when viewed from inside of the vehicle compartment.

Referring particularly to FIGS. 1-3, a side door 1 of a vehicle includes a door outer panel 2 and a door inner panel 3, which overlaps the door outer panel 2. A sealing member 4 is installed at a vehicle compartment side surface (outer surface) of the door inner panel 3. A trim member 5 is installed while covering the sealing member 4. Further, a lifting mechanism 7 for lifting a door glass 6 is placed between the door outer panel 2 and the door inner panel 3.

Figure 4:
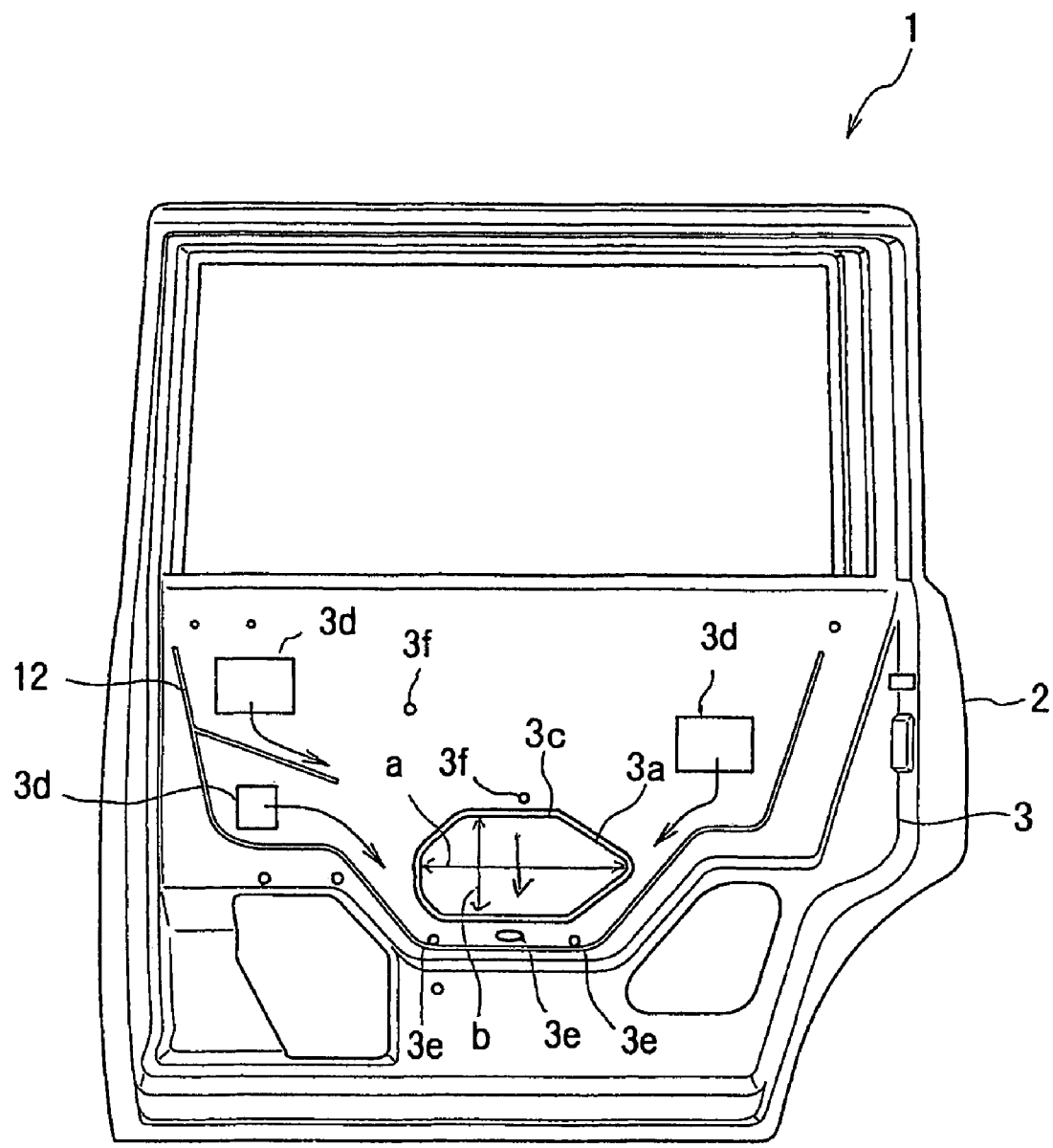
FIG. 4 is an elevational view of a door inner panel constructed in accordance with the first embodiment when viewed from inside of the vehicle compartment.

Referring now to FIGS. 2 and 4, an opening 3a, which serves as a hole for installing the lifting mechanism 7, is formed at the door outer panel 3. In the first embodiment of the invention, the opening 3a has widths "a" and "b," which are orthogonal to each other. The width "a" is longer than width "b". The longer width "a" corresponds to a width along the longitudinal direction of the vehicle, whereas the shorter width "b" corresponds to a width along the vertical direction of the vehicle. A bottom edge of the opening 3a is positioned generally in the same plane below a top edge of the opening 3a. Further, additional openings in the form of a second opening 3d (serving as another hole for installation) or a drain hole 3e and a locking hole 3f, etc., are formed at the door inner panel 3.

As shown in FIGS. 2 and 3, the sealing member 4 is installed to cover the opening 3a of the door inner panel 3. This is to prevent any water or dust from entering the vehicle compartment through the opening 3a.

Figure 5:
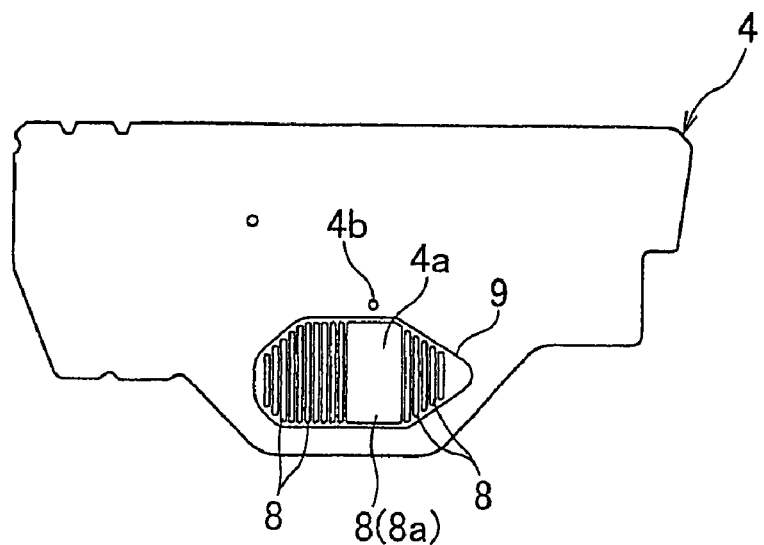
FIG. 5 is an elevational view of a sealing member constructed in accordance with the first embodiment when viewed from inside of the vehicle compartment.
Figure 6:
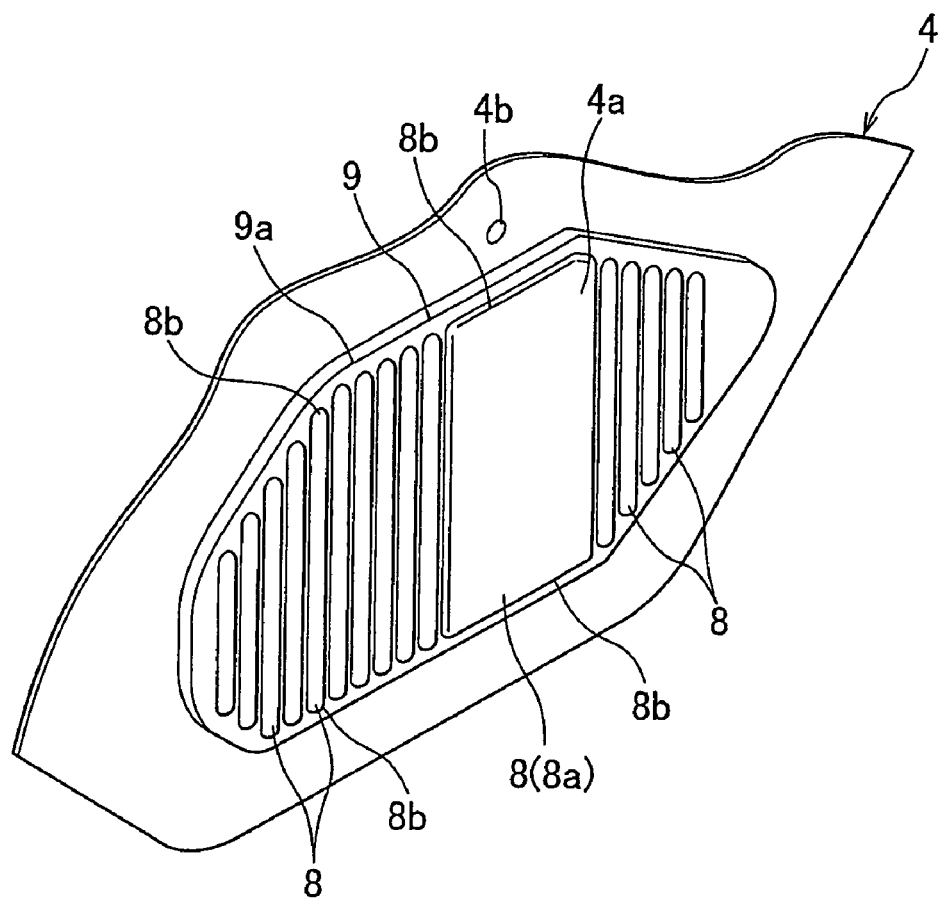
FIG. 6 is a perspective view of a covering portion of a sealing member constructed in accordance with the first embodiment.
Figure 7:
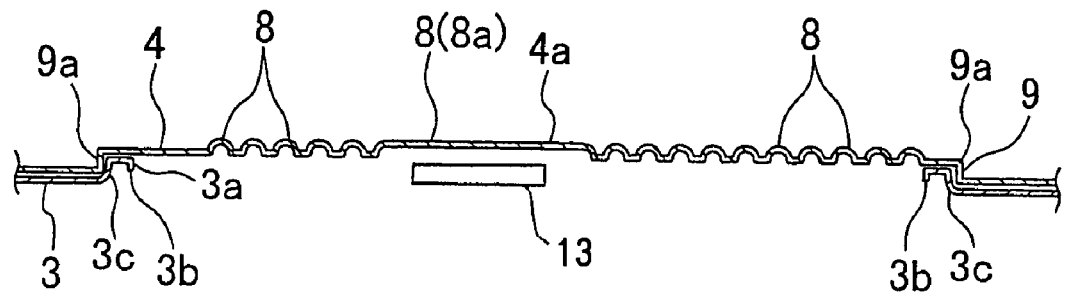
FIG. 7 is a cross-sectional view of the side door taken along the line B-B shown in FIG. 3.

Referring to FIGS. 5-7, a plurality of beads 8 are installed at a covering portion 4a, which faces the opening 3a formed in the sealing member 4. Specifically, an embossed portion 9 for covering the opening 3a is formed at the covering portion 4a. The beads 8 are installed on the embossed portion 9. The beads 8 and the embossed portion 9 are configured to protrude inward in a direction of the vehicle compartment. The sealing member 4 shown is integrally formed of a resin material. In other words, the beads 8 and the embossed portion 9 can be integrally formed with the other portions of the sealing member.

Figure 8:
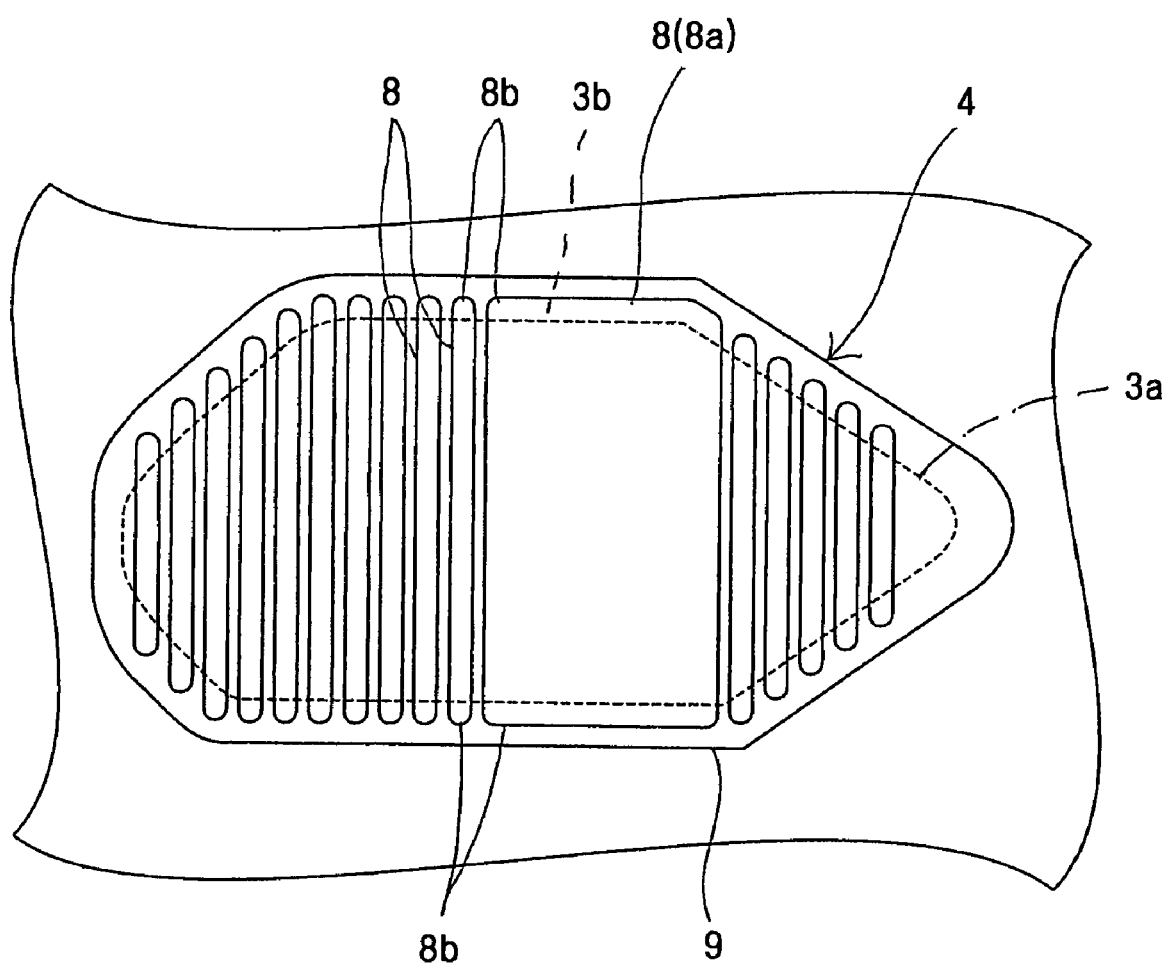
FIG. 8 is an elevational view of a portion of the inside structure of a side door of a vehicle constructed in accordance with the first embodiment when viewed from inside of a vehicle compartment.

The beads 8 are formed to be parallel to each other such that the longitudinal directions thereof are disposed along the vertical direction of the vehicle. That is, the longitudinal direction of each bead 8 is disposed along the direction of the shorter width "b." Among the beads 8 there is a wider bead 8a, which is formed to be wider than the other beads 8. An apex of the protruded portion of the wider bead 8a is formed to have a flat shape. Further, as shown in FIGS. 2 and 8, the beads 8 are formed such that both ends 8b are overlapped with an edge 3b of the opening 3a when viewed from inside of the vehicle compartment.

Referring now to FIGS. 2, 6 and 7, an edge 9a of the embossed portion 9 is formed so as to be in contact with the edge 3b of the opening 3a when the embossed portion 9 is installed at the door inner panel 3. The edge 9a of the embossed portion 9 serves as a contact portion.

Installation structures of the sealing member 4 are now explained. A locking portion 3c is formed at the edge 3b of the opening 3a of the door inner panel 3 as shown in FIGS. 2, 4 and 7. The locking portion 3c is vertically raised toward the inside of the vehicle compartment. The embossed portion 9 is externally fitted into the locking portion 3c. The locking portion 3c locks the edge 9a of the embossed portion 9 in position with the door inner panel 3. In this state, the sealing member 4 including its edge is adhered to the door inner panel 3 using an adhesive, etc.

Specifically, as shown in FIG. 4, a band-shaped butyl rubber 12 serving as an adhesive is installed at the vehicle compartment side surface of the door inner panel 3 with respect to the bottom edge of the sealing member 4 and the edge in the longitudinal direction of the vehicle. The sealing member 4 is adhered to the vehicle compartment side surface of the door inner panel 3 by the butyl rubber 12. Further, a top edge of the sealing member 4 is interposed between the door inner panel 3 and the trim member 5. The butyl rubber 12 is formed with a slope such that any rainwater that penetrates between the door inner panel 3 and the sealing member 4 from the openings 3a and 3d of the door inner panel 3 is guided into the drain hole 3e of the door inner panel 3. In other words, the butyl rubber 12 further serves the function of guiding the rainwater into the drain hole(s) 3e as shown in FIG. 2.

Further, as shown in FIGS. 2 and 3, the wider bead 8a is pushed against the door inner panel by a cable 10 serving as a pushing member at the covering portion 4a of the sealing member 4. Accordingly, the sealing member 4 is pushed against the door inner panel 3 by the cable 10. Further, it is preferred that the cable 10 pushes at least one of the covering portion 4a of the sealing member and a portion around the covering portion 4a toward the door inner panel 3.

Figure 9:
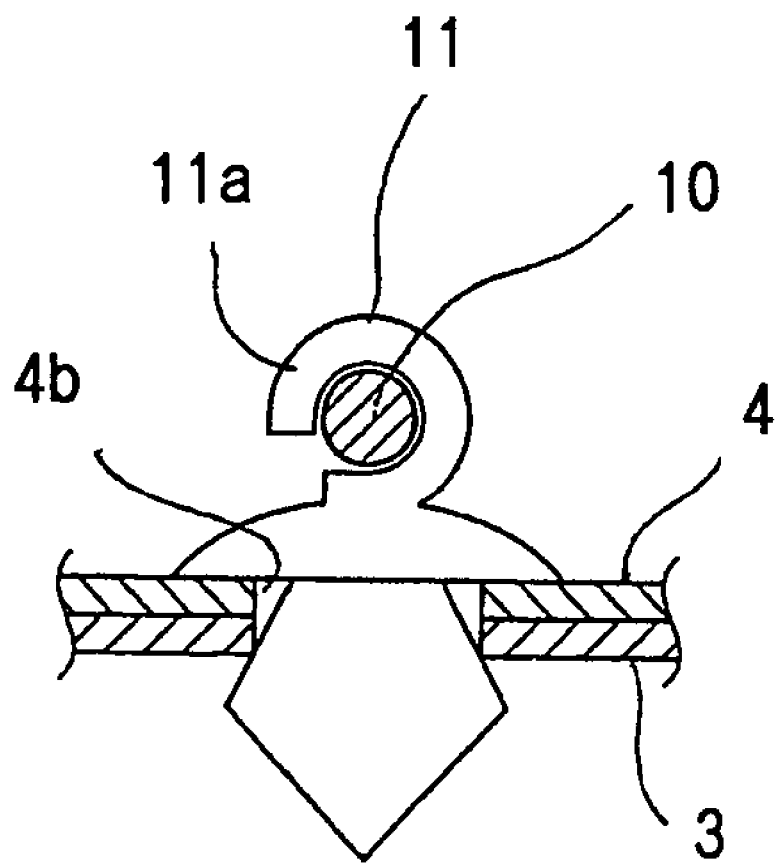
FIG. 9 is a cross-sectional view illustrating a clip for the sealing member constructed in accordance with the first embodiment when installed.

The cable 10 comprises a wire for connecting an operating piece and a latch mechanism, which maintains a fully-opened state of the side door 1 of a vehicle. The cable 10 also comprises a tube 10a through which the wire is passed. By pulling the wire using the operating piece, the side door 1 of a vehicle implementing the latch mechanism is released from the fully-opened state. The cable 10 is fixed to the door inner panel 3 using a plurality of clips 11. As shown in FIG. 9, by example, each clip 11 is passed through a through hole 4b provided by the sealing member 4 and becomes fixed to the door inner panel 3. The clip 11 is locked at a locking hole 3f of the door inner panel 3 (see FIG. 4) and holds the cable 10 using a cable support 11a. Further, even at a portion where the sealing member 4 is not interposed between the cable 10 and the door inner panel 3, the cable 10 can fixed to the door inner panel 3 by a clip 11 locked at a locking hole 3f of the door inner panel 3. Thus, the sealing member 4 becomes fixed to the door inner panel 3. Further, the through-hole 4b of the sealing member 4 does not have to be pre-formed in the sealing member 4. Rather, the through-hole 4b can be formed by pushing and passing through a tip of the clip 11 against the sealing member 4 when installing the clip 11 at the door inner panel 3.

A method of installing the sealing member 4 is now explained. First, the door outer panel 2, the door inner panel 3 and the sealing member 4 are prepared. The door inner panel 3 is installed at the door outer panel 2. Then, the beads 8 of the sealing member 4 are positioned so as to be disposed opposite to the opening 3a of the door inner panel 3. Further, the opening 3a is covered with the sealing member 4. In this state, the sealing member 4 is installed at the vehicle compartment side surface of the door inner panel 3. In particular, the cable 10 is installed at the door inner panel 3 by the clip 11. The sealing member 4 is adhered to the door inner panel 3 using the butyl rubber 12 and is pushed against the door inner panel by the cable 10. Thereafter, the trim member 5 is installed at the door inner panel 3, and the sealing member 4 is interposed between the trim member 5 and the door inner panel 3.

In such a configuration, an example in which rainwater (penetrated between the door outer and inner panels 2 and 3) is permeated between the door inner panel 3 and the sealing member through the openings 3a and 3d (the flow direction of rainwater is indicated by an arrow in FIGS. 2 and 4) is explained. In this case, the rainwater flows downwardly and reaches the butyl rubber 12. Then, the rainwater is guided into the butyl rubber 12 and reaches the drain hole(s) 3e of the door inner panel 3. The rainwater is thereafter discharged from the drain hole 3e into the surface (inner surface) opposite to the vehicle compartment of the door inner panel 3. The rainwater is then returned between the door outer panel 2 and the door inner panel 3. At this time, since the longitudinal directions of the beads 8 of the sealing member 4 are formed along the vertical direction of the vehicle, the rainwater flowing on the beads 8 can flow smoothly and downwardly.

As mentioned above, the rainwater flows downwardly on the surface (inner surface) opposite to the vehicle compartment of the door inner panel 3 and reaches the top edge of the opening 3a. In such a case, the rainwater drops from the top edge of the opening 3a of the door inner panel 3 to the bottom edge of the opening 3a, which is located in substantially the same plane below the top edge. At this time, the rainwater falls into the bottom edge of the opening 3a to generate a dropping sound.

Figure 10A:
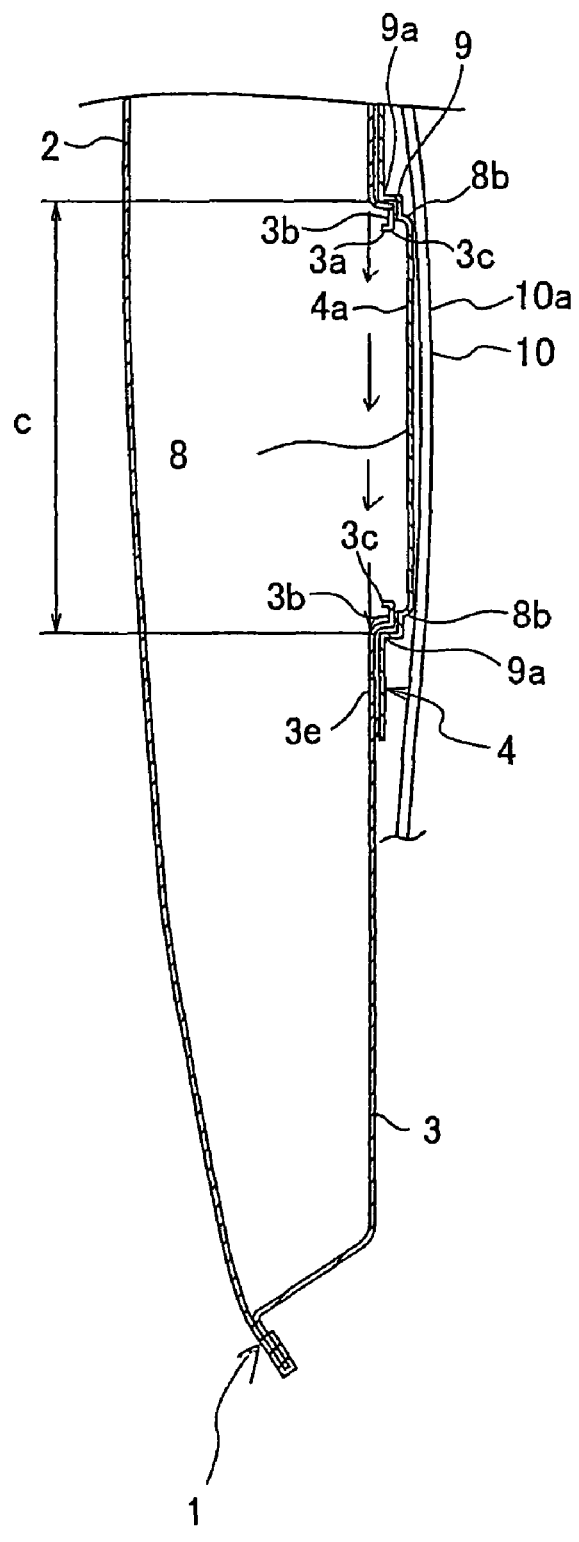
FIG. 10A is a cross-sectional view taken along A-A in FIG. 1 illustrating certain features of a side door of the vehicle in which a bead is protruded in a direction of the vehicle compartment.
Figure 10B:
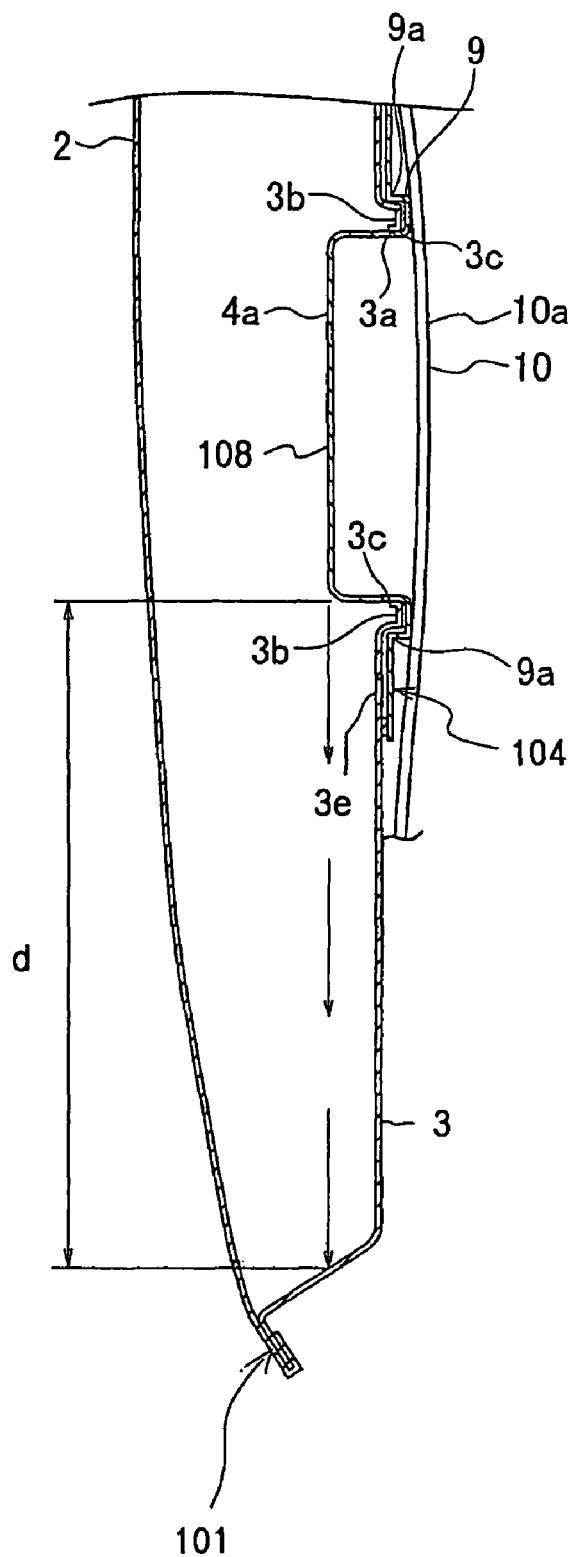
FIG. 10B is a cross-sectional view illustrating a modified side door of a vehicle in which a bead is protruded away from a vehicle compartment.

Hereinafter, the relationship between the beads 8 and the dropping sound of rainwater will be explained with reference to FIGS. 10A and 10B, which are cross-sectional views illustrating a side door of a vehicle. Further, FIG. 10A is a cross-sectional view illustrating a side door 1 of a vehicle in which a bead 8 protrudes in the direction of a vehicle compartment. FIG. 10B is a cross-sectional view illustrating a modified side door 1 of a vehicle in which a bead 108 protrudes in a direction of the outside of the vehicle compartment. Further, in the modified embodiment, the same or like portions as the side door 1 of a vehicle are indicated by the same or like reference numerals, the explanations of which will be omitted. (This is also applicable to the following modified embodiments.)

As shown in FIG. 10B, the bead 108 of the sealing member 104 at the side door 101 of a vehicle, which is constructed in accordance with the modified embodiment, protrudes to the outside of the vehicle compartment. A bottom portion of the door inner panel 3 is positioned immediately below a bottom end of an apex of the protruded portion. Other portions of the side door 101 are identical to those of the side door 1 described above.

Further, a distance "d" (shown in FIG. 10B) between the bottom end of the apex of the protruded portion of the bead 108 and the bottom portion of the door inner panel 3 located below the apex at the side door 101 may be longer than a distance "c" (shown in FIG. 10A) between the top and bottom edges of the opening 3a of the door inner panel 3 at the side door 1. In such a case, the sound of rainwater that drops from the top end of the opening 3a to the bottom end located immediately below the top end is lower than the sound of rainwater dropping from the bottom end of the apex of the protruded portion to the bottom portion of the door inner panel 3.

As explained above, the beads 8 are installed at the covering portion 4a of the sealing member 4, which faces the opening 3a of the door inner panel 3, in order to increase the stiffness of the covering portion 4a. Therefore, it is possible to prevent the covering portion 4a from oscillating, thereby inhibiting the sealing member 4 from generating oscillating noises.

Further, in the first embodiment as described, the beads 8 are formed such that both ends 8b overlap with the edge 3b of the opening 3a when viewed from inside of the vehicle compartment. Therefore, it is possible to increase the stiffness of the covering portion 4a compared to a case in which the beads 8 are overlapped with the opened area of the opening 3a.

Further, the edge 9a of the embossed portion 9 serves as a contact portion, which contacts the edge 3b of the opening 3a while being installed at the door inner panel 3. Therefore, it is possible to easily position the door inner panel 3 in the lateral direction of the vehicle.

Moreover, the covering portion 4a is pushed toward the door inner panel 3 by the cable 10 such that the sealing member 4 is pushed against the door inner panel 3 by the cable 10. Therefore, it is possible to prevent the covering portion 4a of the sealing member 4 from oscillating, thereby inhibiting the oscillating noises from being generated.

Further, in the first embodiment, the beads 8 of the sealing member are protruded in a direction of the vehicle compartment. Thus, it is possible to push the entire apex of the protruded portion of the beads 8 by using the cable 10. It is also possible to prevent the covering portion 4a of the sealing member 4 from oscillating, thereby inhibiting the oscillating noises from being generated.

Additionally, in the first embodiment, the wider bead 8a is pushed against the door inner panel 3 by the cable 10. Thus, it is possible to absorb the varying placement of the cable 10 with the wider bead 8a to thereby receive the cable with the wider bead 8a.

Moreover, an embossed portion 9 is provided, which is installed at the sealing member 4 for covering the opening 3a. Further, the locking portion 3c, which is formed at the edge 3b of the opening 3a for locking the edge 9a of the embossed portion 9, is provided. Therefore, it is possible to easily position the sealing member 4.

The beads 8 and the embossed portion 9 are integrally formed with other portions of the sealing member 4 according to one embodiment. Thus, the number of components of the sealing member 4 can be reduced compared to a structure in which the beads 8 and the embossed portion 9 are separately formed from other portions of the sealing member 4.

In addition, the beads 8 and the embossed portion 9 of the sealing member 4 can protrude to the inside of the vehicle compartment. Thus, a space between the sealing member 4 and the door outer panel 2 is increased compared to a case in which the beads 8 or the embossed portion 9 protrude to the outside of the vehicle compartment. Accordingly, it is possible to prevent the sealing member 4 from interfering with a component 13 of the lifting mechanism 7, etc. (shown in FIG. 7). Further, in the first embodiment there is provided a wider bead 8a, which is wider than other beads 8. Thus, a space between the sealing member 4 and the door outer panel 2 is further increased. Therefore, the sealing member 4 can be further prevented from interfering with a component 13 of the lifting mechanism 7, etc.

Further, as described above, the longer width "a" and the shorter width "b" (shorter than the longer width "a"), which are opening widths in the orthogonal direction, are set in the opening 3a of the door inner panel 3. The beads 8 of the sealing member 4 are formed such that the longitudinal directions thereof are along the direction of the shorter width "b" of the opening 3a. Therefore, the stiffness of the beads 8 can be increased compared to a case in which the beads 8 are formed along the longer width "a." Thus, it is possible to prevent the facing portion 4a of the sealing member 4 from oscillating, thereby inhibiting the generation of oscillating noise.

Figure 11:
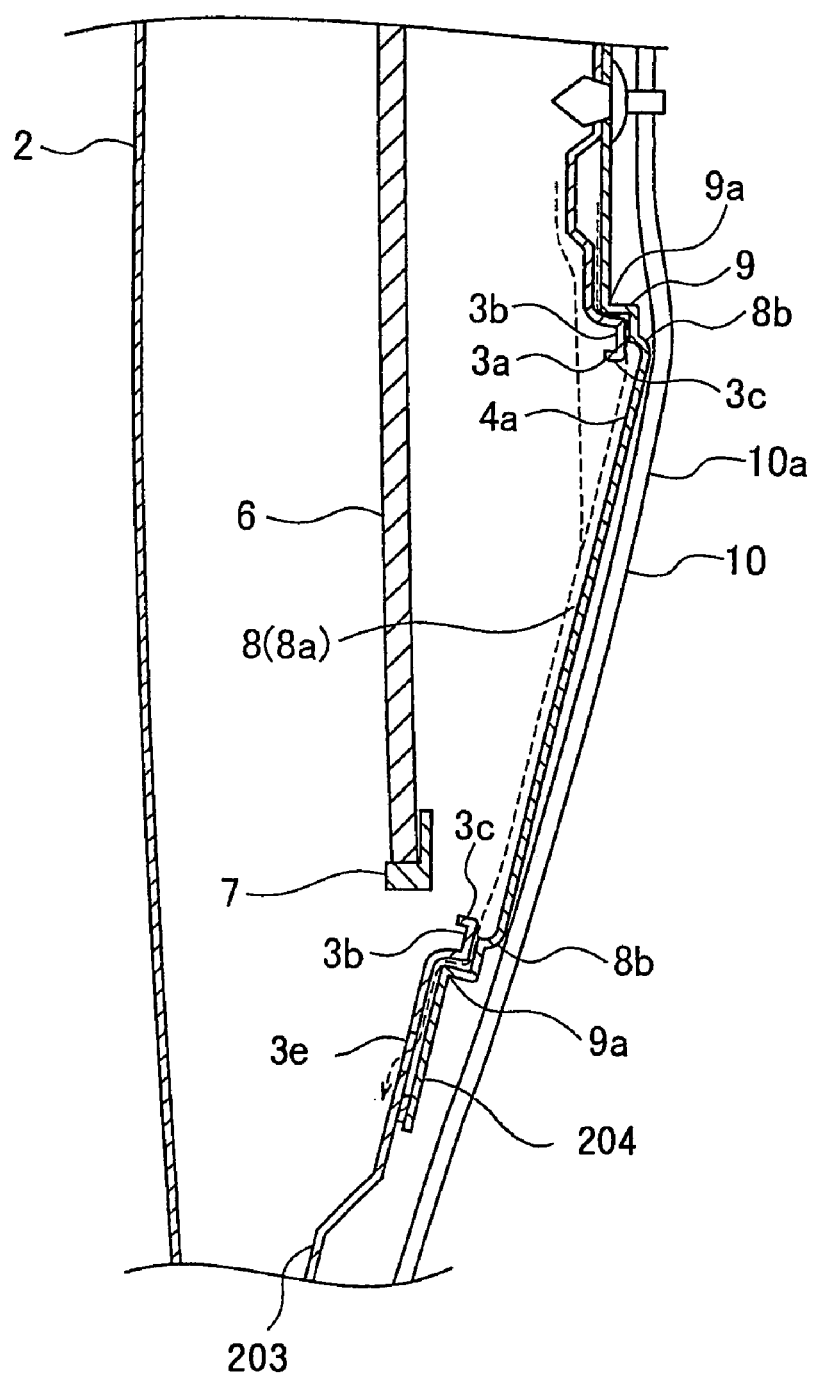
FIG. 11 is a cross-sectional view illustrating a modified side door of the vehicle.

A modified embodiment is now explained with reference to FIG. 11. FIG. 11 is a cross-sectional view illustrating a side door of a vehicle constructed in accordance with the modified embodiment. Further, FIG. 11 is a cross-sectional view taken along the line A-A shown in FIG. 1. In a side door 201 of this modified embodiment, a portion below the opening 3a of a door inner panel 203 is inclined downwardly and outwardly. A portion below the covering portion 4a of a sealing member 204 is also inclined downwardly and outwardly. Further, the covering portion 4a of the sealing member 204 is positioned immediately below the top edge of the opening 3a of the door inner panel.

In such a configuration, the rainwater penetrating between the door outer and inner panels 2 and 203 may flow to the top edge of the opening 3a of the door inner panel 203 (the flow direction of water is shown by the dashed line in FIG. 11). In this case, the rainwater drops from the top edge of the opening 3a of the door outer panel 203 to the covering portion 4a of the sealing member 204 located immediately below the top edge. According to such a configuration, the dropping distance of rainwater is shorter than when the rainwater drops from the top edge of the opening 3a of the door inner panel 3 to the bottom edge of the opening 3a located below the top edge. Thus, the dropping sound of rainwater can be reduced.

Figure 12:
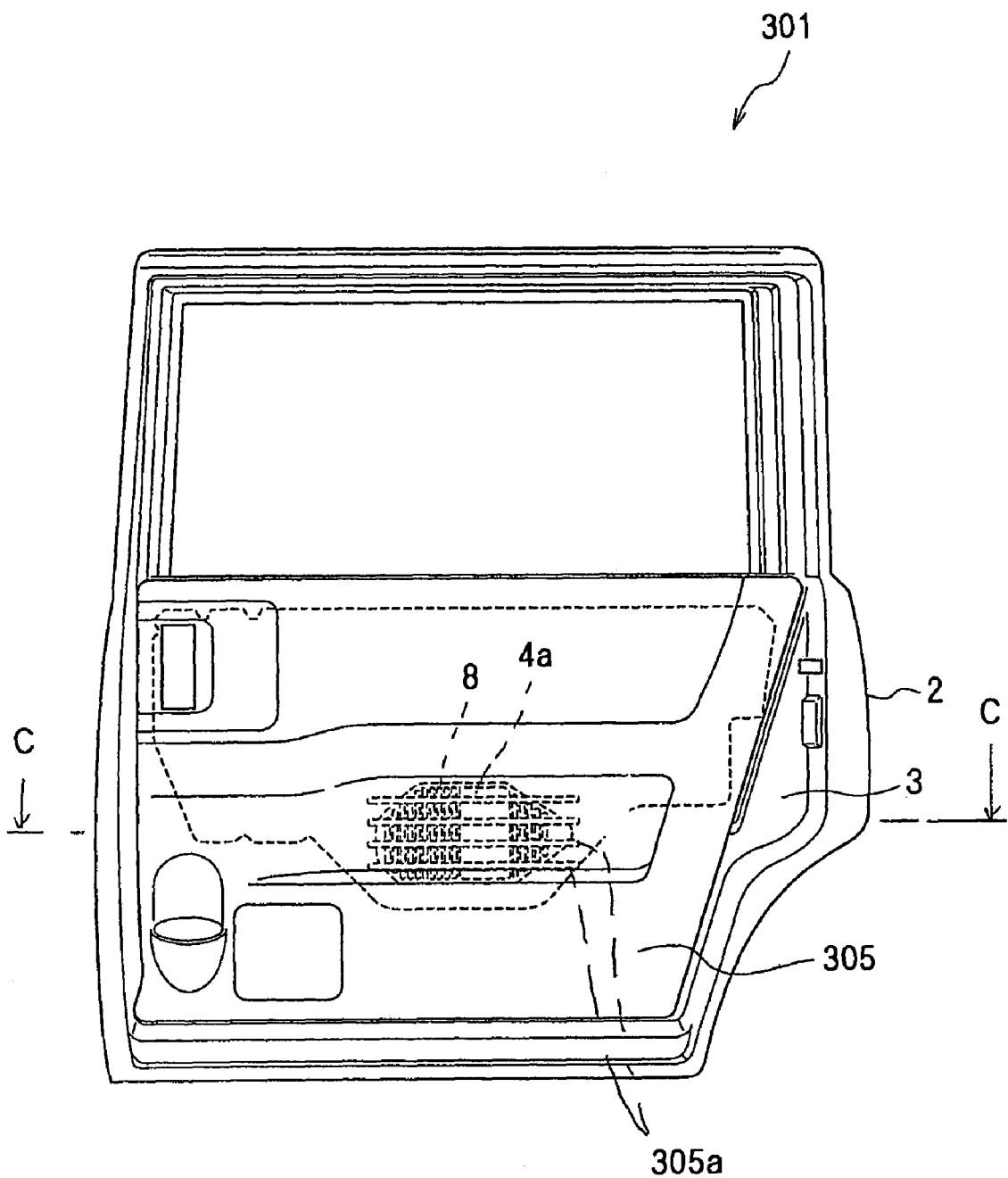
FIG. 12 is a elevational view of a side door of a vehicle constructed in accordance with a second embodiment when viewed from inside of a vehicle compartment.
Figure 13:
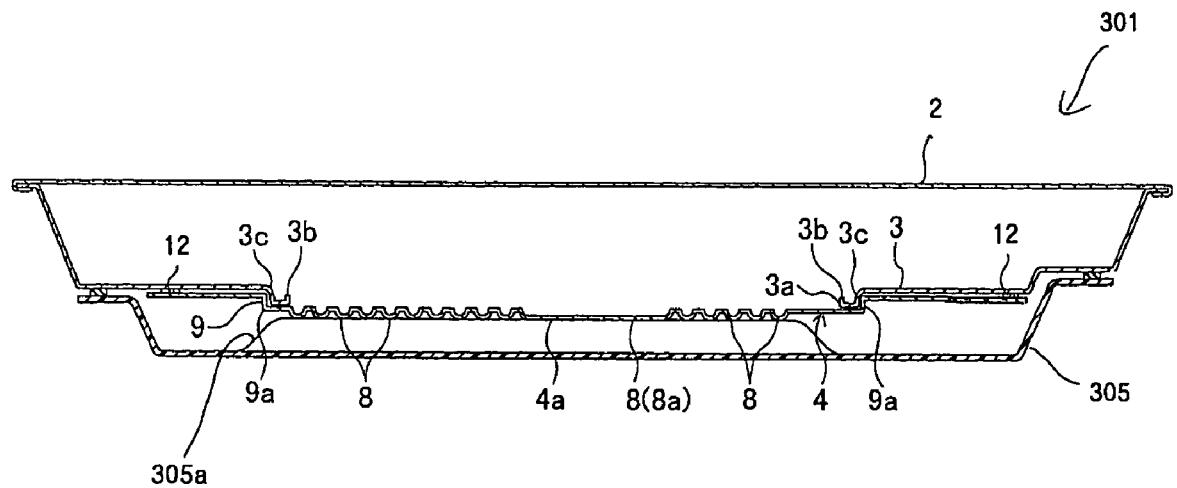
FIG. 13 is a cross-sectional view of the side door taken along the line C-C shown in FIG. 12.

A second embodiment is now explained with reference to FIGS. 12 and 13. FIG. 12 illustrates a side door of a vehicle constructed in accordance with a second embodiment when viewed from inside of a vehicle compartment. FIG. 13 is a cross-sectional view taken along the line C-C shown in FIG. 12. It should be noted that certain members are not shown in FIG. 13. Further, the same or like portions as the previous embodiment are indicated by the same or like reference numerals, the explanations of which will be omitted (as is also applicable to the following embodiments).

The second embodiment differs from the first embodiment in that the pushing member of a door 301 is not the cable 10, but rather a trim member 305.

A plurality of ribs 305a, which serves as a pushing portion, is vertically erected on a surface facing the sealing member 4 in the trim member 305. The ribs 305a are spaced apart from each other in the vertical direction and extend in the longitudinal direction of the vehicle. The ribs 305a are in contact with the beads 8 of the opposed portion 4a of the sealing member 4. All the beads 8 are in contact with the ribs 305a as shown. The trim member 305 pushes the covering portion 4a of the sealing member 4 toward the door inner panel 3 using the ribs 305a. Accordingly, the sealing member 4 is pushed against the door inner panel 3 by the trim member 305.

According to such a configuration, the covering portion 4a of the sealing member 4 is pushed toward the door inner panel 3 by the trim member 305. As such, the sealing member 4 is pushed against the door inner panel 3 by the trim member 305. Thus, similar to the case in which the pushing member is the cable 10, it is possible to prevent the covering portion 4a of the sealing member 4 from oscillating. Therefore, the generation of oscillating noises can be prevented.

Figure 14:
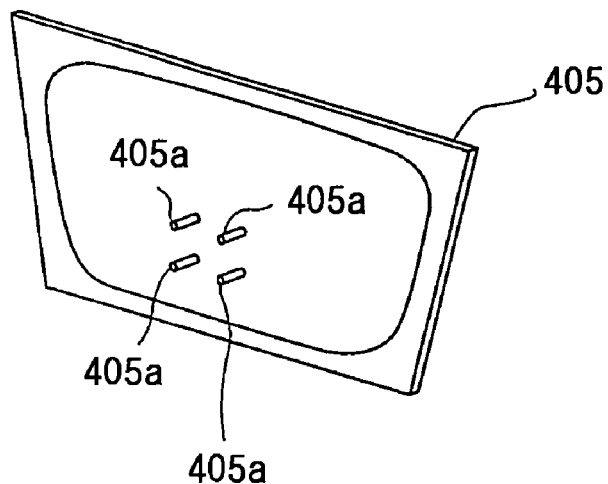
FIG. 14 is a perspective view of a trim member constructed in accordance with a third embodiment when viewed from outside of a vehicle compartment.
Figure 15:
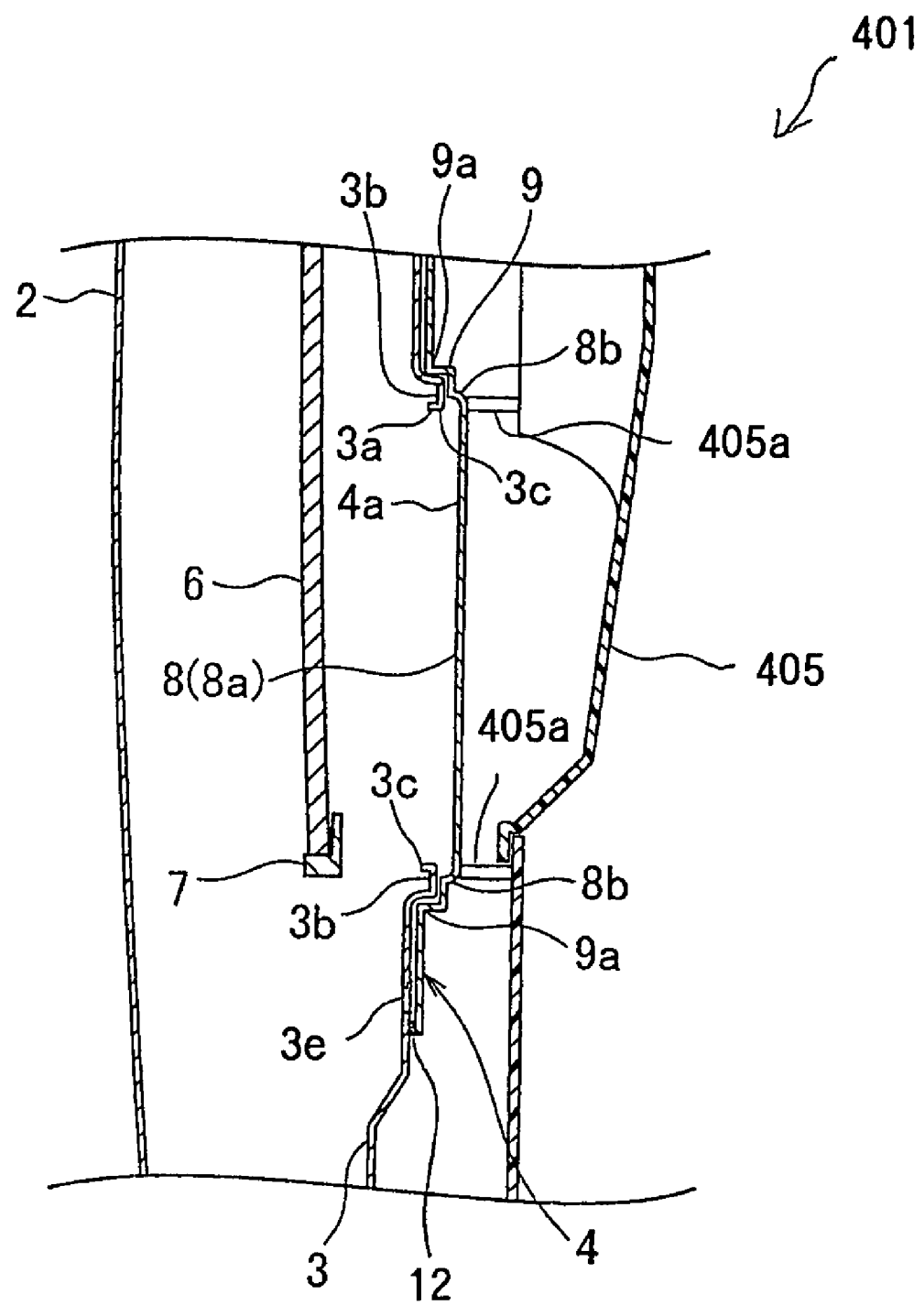
FIG. 15 is a cross-sectional view illustrating a side door of a vehicle constructed in accordance with the third embodiment.
Figure 16:
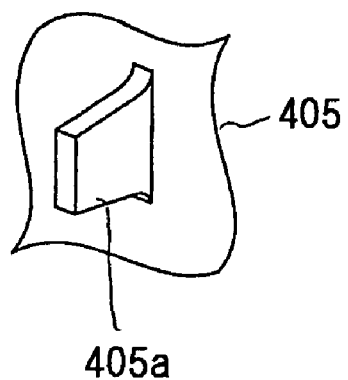
FIG. 16 is a perspective view of a modified projecting portion of the trim member.

A third embodiment of the invention is now described with reference to FIGS. 14-16. FIG. 14 illustrates a trim member 405 constructed in accordance with the third embodiment when viewed from outside of a vehicle compartment. FIG. 15 is a cross-sectional view illustrating a side door 401 of a vehicle. FIG. 16 is a perspective view of a projecting portion 405a constructed in accordance with a modified version of the third embodiment.

The third embodiment differs from the second embodiment in that the pushing portions, which serve as pushing members for door 401, comprise four projecting members 405a.

The projecting members 405a are formed to have a substantially cylindrical boss shape. Further, the projecting members 405a can be formed to have a plate-rib shape as shown in FIG. 16. As shown in FIG. 14, the projecting members 405a are spaced apart from each other such that they are positioned at apices of a square. As shown in FIG. 15, the projecting members 405a push the covering portion 4a of the sealing member 4, or a portion around the covering portion 4a, toward the door inner panel 3. Accordingly, the sealing member 4 is pushed against the door inner panel 3 by the trim member 405.

According to this configuration, the covering portion 4a of the sealing member 4 is pushed toward the door inner panel 3 by the trim member 405 serving as a pushing member. As such, the sealing member 4 is pushed against the door inner panel 3 by the trim member. Therefore, similar to the fourth embodiment described below, the covering portion 4a of the sealing member 4 can be prevented from oscillating, thereby inhibiting the oscillating noise from generating.

Figure 17:
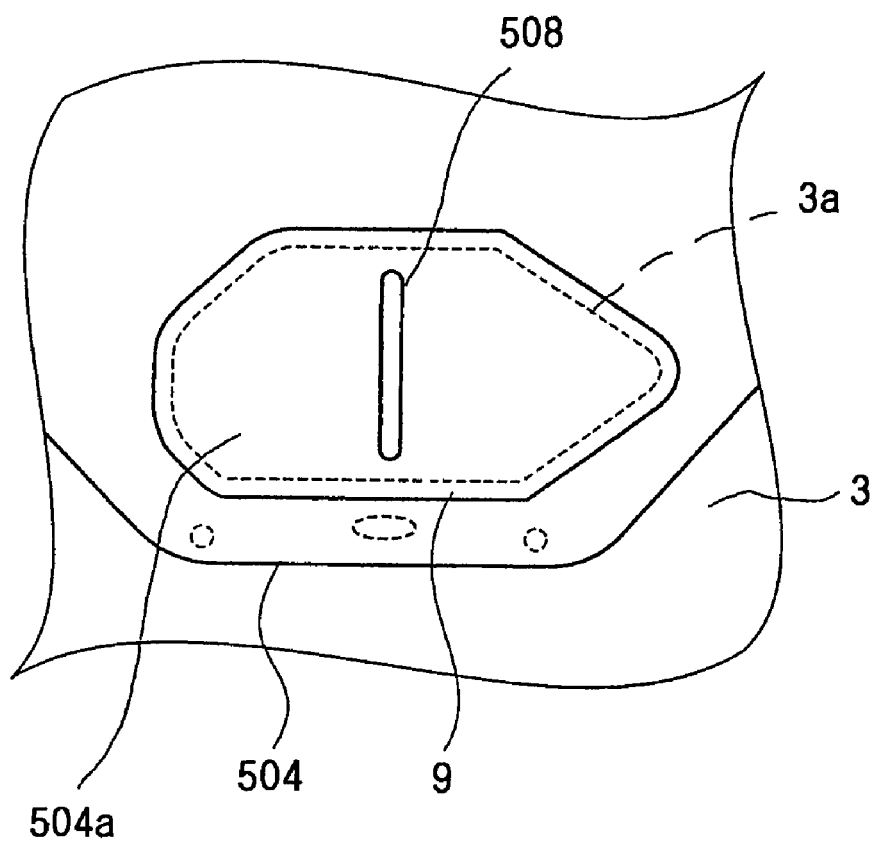
FIG. 17 is an elevational view of a portion of a side door of a vehicle constructed in accordance with a fourth embodiment when viewed from inside of a vehicle compartment.

The fourth embodiment is now described with reference to FIG. 17. FIG. 17 illustrates an inside structure of a side door of a vehicle constructed in accordance with a fourth embodiment when viewed from inside of a vehicle compartment. The fourth embodiment differs from the first embodiment as to the bead 508 of a sealing member 504. The bead 508 of the fourth embodiment is formed such that the entire bead 508 overlaps with an area inside the opening 3a of the door inner panel 3 when viewed from the vehicle compartment.

According to this configuration, the bead 508 is installed at the covering portion 504a of the sealing member 504, which faces the opening 3a of the door inner panel 3, to increase the stiffness of the covering portion 504a. Therefore, it is possible to prevent the covering portion 504a from oscillating, thereby inhibiting the generation of the oscillating noise in the sealing member 504.

Further, it should be understood that the present invention is not limited to the above-described embodiments. That is, various embodiments can be made without departing from the scope of the invention. For example, the invention may also be applied to a back door of a vehicle.

Further, the cable 10 that serves as the pushing member of the first embodiment can also be the cable for supplying power to the lifting mechanism 7.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A sealing member for covering an opening in a door inner panel of a vehicle, comprising:
   a covering portion configured and arranged to cover the opening of the door inner panel comprising an embossed portion having at least one bead formed therein, wherein the embossed portion is coupled to a wall portion formed at an edge of the opening.

2. The sealing member according to claim 1, wherein the bead has opposing ends that extend past the edge of the opening when viewed from inside of a passenger compartment of the vehicle.

3. The sealing member according to claim 1, further comprising:
   a contact portion configured and arranged to abut a portion of the door inner panel proximal to the edge of the opening when the covering portion is installed on the door inner panel.

4. The sealing member according to claim 1, wherein the embossed portion protrudes in a direction toward a passenger compartment of the vehicle.

5. The sealing member according to claim 1, wherein the at least one bead protrudes in a direction toward a passenger compartment of the vehicle.

6. The sealing member according to claim 1, wherein the at least one bead has a longitudinal length arranged along a vertical direction with respect to the vehicle.

7. The sealing member according to claim 1, wherein the covering portion has first and second dimensions arranged orthogonal to each other, the first dimension being less than the second dimension, wherein the at least one bead is formed such that longitudinal lengths are disposed along the first dimension.

8. The sealing member according to claim 1, wherein the at least one bead is dimensioned and arranged to be contained within an area inside of the opening when viewed from inside of a passenger compartment of the vehicle.

9. A sealing member for a door having an opening formed on an inner panel, comprising:
  a covering portion configured and arranged to cover the opening of the inner panel; and
  at least one reinforcement formed on the covering portion, wherein the at least one reinforcement is composed of a first reinforcement and a second reinforcement, the second reinforcement wider than the first reinforcement; and wherein the second reinforcement is biased toward the inner panel by a latch cable.

10. A sealing member for a door inner panel having an opening formed therein, comprising:
  means for covering the opening at the door inner panel; and
  means for reinforcing at least a portion of the covering means facing the opening, wherein the reinforcing means is composed of a first reinforcement and a second reinforcement, the second reinforcement wider than the first reinforcement; and wherein the second reinforcement is biased toward the inner panel by a latch cable.

11. A door for a vehicle, comprising:
  a door inner panel having an opening formed thereon;
  a sealing member having at least one bead, wherein the sealing member is coupled to the door inner panel such that the at least one bead is located on a side of the sealing member arranged toward a passenger compartment of the vehicle; and
  a pushing member biasing the sealing member toward the door inner panel.

12. The door according to claim 11 wherein the pushing member comprises a cable.

13. The door according to claim 12 wherein the at least one bead includes a wider bead protruding in a direction toward a vehicle passenger compartment; and wherein the wider bead is the pushed portion.

14. The door according to claim 11 wherein the pushing member comprises a trim member covering the sealing member; and wherein the trim member is installed at a surface of a vehicle compartment side of the door inner panel.

15. The door according to claim 11, further comprising:
  a pushed portion disposed around an embossed portion of the sealing member, wherein the pushed portion is biased against the door inner panel and the embossed portion includes the at least one bead.

16. The door according to claim 15 wherein the pushing member comprises a cable biasing the pushed portion of the sealing member against the door inner panel.

17. The door according to claim 16 wherein the at least one bead comprises at least one bead protruding in a direction of the opening.

18. The door according to claim 11, further comprising:
  an attachment member installed between the door inner panel and the sealing member to form a sloped channel operable to direct fluid between the door inner panel and the sealing member to at least one drain hole of the door inner panel.

19. A method of installing a sealing member at a door inner panel having an opening, the method comprising:
  installing a sealing member at the door inner panel and covering the opening, wherein the sealing member comprises an embossed portion having at least one bead formed therein, wherein the embossed portion is coupled to a wall portion formed at an edge of the opening; and
  affixing the sealing member to the door inner panel.

* * * * *